PROCESS FOR DOPING SEMICONDUCTIVE BODIES

Filed Oct. 26, 1961

INVENTORS
MILTON C VANIK
MOISES G. SANCHEZ
GEORGE W. SMOUSE
BY Kenneth E. Prince
ATTORNEY United States Patent Office 3,108,073
Patented Oct. 22, 1963

3,108,073

PROCESS FOR DOPING SEMICONDUCTIVE BODIES

Milton C. Vanik, Brookeville, Moises G. Sanchez, Severna Park, and George W. Smouse, Baltimore, Md., assignors to W. R. Grace & Co., New York, N.Y., a corporation of Connecticut
Filed Oct. 26, 1961, Ser. No. 147,963
9 Claims. (Cl. 252—62.3)

Figures 1, 2:
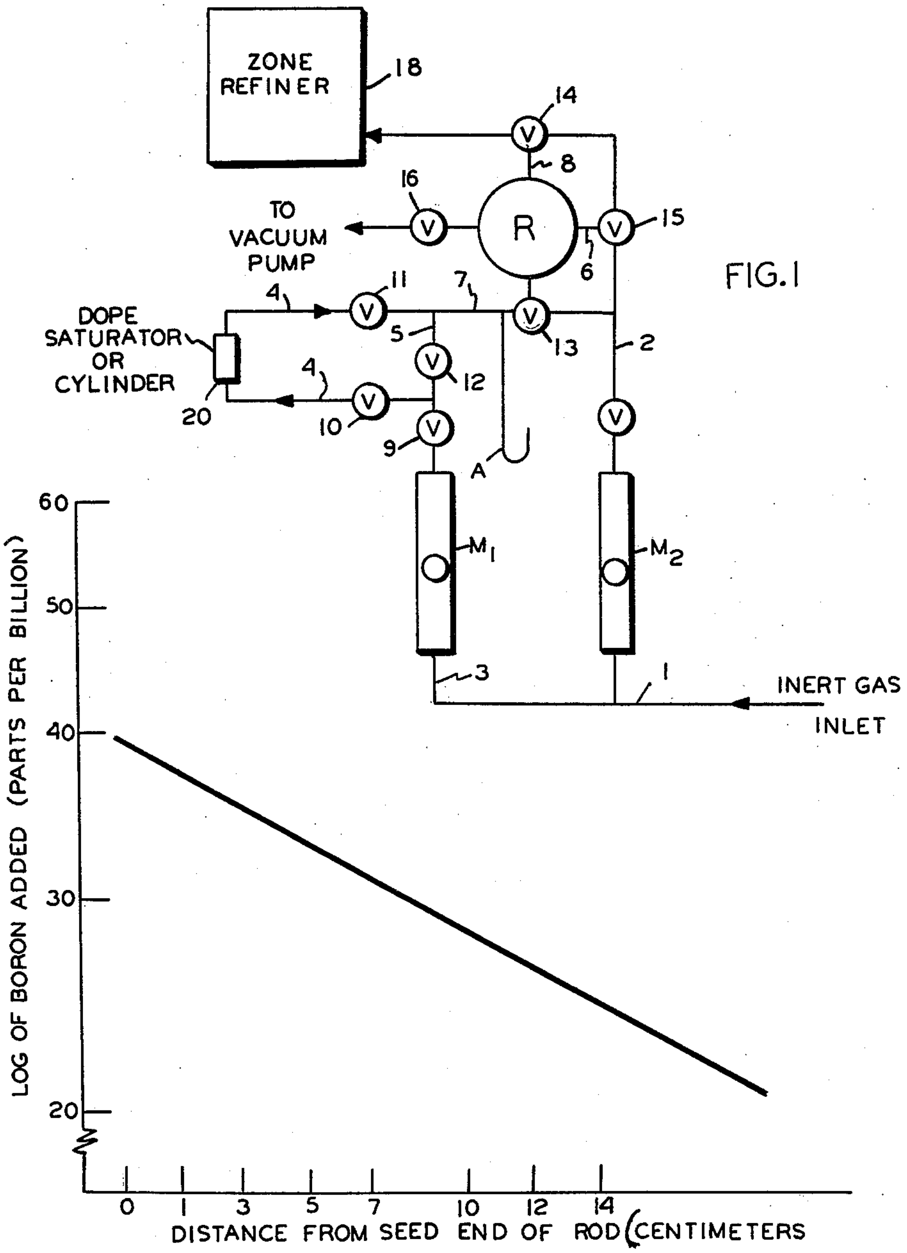

This invention relates to a process for doping semiconductive bodies to produce monocrystalline semiconductor materials suitable for use in making diodes, transistors and the like. More particularly, this invention relates to a process for introducing doping elements into an elongated semiconductive body in such manner as to produce a doped body having an essentially constant impurity content throughout its length.

The manufacture of many semiconductor devices requires or makes desirable the use of single crystals of semiconductor material which have essentially constant electrical properties throughout their lengths. Since the critical electrical properties, e.g., resistivity, of a crystal of semiconductive material are determined by the impurities contained therein, the fabrication of single crystals having an essentially uniform impurity content becomes very important and highly desirable. The typical semiconductive materials in use today are silicon and germanium. The impurities usually used to modify the electrical properties of silicon and germanium crystals are so-called "acceptor" elements, comprising the elements in group 3 of the periodic table including, for example, boron, aluminum, and gallium; and so-called "donor" elements, comprising elements in group 5 of the periodic table including, for example, phosphorus, arsenic, and antimony.

In preparing germanium and silicon single crystals for use in semiconductor devices, a very small, critical amount of one or more of the impurity elements is added to a hyperpure body of the semiconductive material. Introduction of such impurities into semiconductive materials is commonly called "doping." Doping can be accomplished in several different ways. One of the more common doping methods is the gas phase doping process wherein a gaseous doping substance in elemental form or as a compound of one of the doping elements mentioned above is carried by a stream of an inert gas into contact with a semiconductive body which is being zone refined. The impurity element reacts or diffuses into the molten zone and is maintained in the semiconductive body as it is zone refined and thus becomes distributed throughout the body.

In the zone refining of semiconductive bodies, it is known that the concentration of impurities in the body is depleted in that portion of the body which is first to recrystallize. This results from the fact that the various impurities in the semiconductive body have different solubilities in the body depending upon whether it (the body) is in the liquid or solid state. The distribution coefficient of any particular impurity, defined as the ratio of impurity concentration in the solid recrystallizing from the molten zone to impurity concentration in the molten zone, indicates the degree to which the impurity will tend to be depleted in the first portion of the semiconductive body to crystallize. Those impurities whose distribution coefficient is close to unity will not tend to segregate to any significant extent, while those impurities whose distribution coefficient is significantly less than unity, e.g., 0.7 or less, will occur in different concentrations along the length of the zone refined body.

Because of the segregation tendencies noted above, gas doping of semiconductive bodies as they are being zone refined does not always result in a uniform impurity concentration in the refined body. In some few instances, where the distribution coefficient of the doping impurity element is close to one (for example, boron in silicon has a coefficient of about 0.9) segregation of the doping impurity is very minor, and sufficiently uniform electrical properties can be obtained without special steps. When the distribution coefficient of the impurity element is less than about 0.05, commercially satisfactory concentration uniformity can be achieved by the known "zone-leveling" process, in which all of the doping substance is added to one end of the body to be doped and the impurity is then distributed throughout the body by zone refining. Insofar as is known, no satisfactory simple procedure has been devised for obtaining substantially uniform impurity concentrations throughout the length of a gas-doped, zone-refined body of semiconductive material when the impurity element has a distribution coefficient of less than about 0.7 but greater than about 0.05.

It is an object of this invention to provide a process for obtaining a substantially uniform impurity concentration in a semiconductive body which is gas-doped during zone refining. It is a further object of this invention to provide a process for concomitantly zone refining and gas doping a semiconductor body in a manner which produces a doped body having substantially uniform electrical properties throughout its entire length. It is another object of this invention to provide a process for zone refining a semiconductive body while gas doping with a doping impurity having a segregation coefficient of less than about 0.7 and greater than about 0.05, and yet maintaining a substantially uniform concentration of impurity throughout the body produced. Other objects of this invention will be apparent to those skilled in the art in view of the more detailed description which follows.

It has been found that the objects of this invention can be achieved by zone refining a semiconductive body, adding a doping impurity to the body in exponentially decreasing amounts as the zone refining proceeds, and preferably adjusting the time constant of the exponential addition to compensate for the segregation of impurity which occurs as a result of the zone refining. Since the impurity concentration in the semiconductive body normally increases exponentially along the length of the body as it is zone refined, it becomes a relatively simple matter to balance the time constants of the two exponential functions and thus obtain the desired result of uniform impurity concentration.

The semiconductive body to be doped in accordance with the process of the invention is ordinarily a pre-refined single crystal or a polycrystalline ingot of known impurity concentration. The pre-refining can be accomplished in any known manner, such as by a preliminary zone refining treatment. The body is preferably in the form of a rod or bar so as to permit utilization of the floating-zone methods of zone refining; as described for example in Mataré, U.S. Patent 2,897,329, and Emeis et al., U.S. Patent 2,904,663; and thus avoid as much as possible undesirable contamination of the semiconductive body.

Doping substances which can be used in the process of this invention include (but are not limited to) elements of groups 3 and 5 of the periodic table as well as any compounds or alloys of these elements which have a sufficient vapor pressure to permit them to be carried in the gaseous state in a stream of inert carrier gas in sufficient quantities to produce a desired doping level. Preferred doping substances include boron trifluoride, boron trichloride, phosphorus trichloride, phosphorus pentachloride, phosphine, gallium trichloride, antimony trichloride, arsenic trichloride, elemental arsenic, red phosphorus, white phosphorus and the like.

The inert carrier gas serves not only as a vehicle for bringing the doping substance into contact with the molten zone of semiconductive material, but also provides in the zone refining apparatus an inert ambient. The inert carrier gas may be hydrogen, argon, neon, helium or any other like gas which is non-reactive with the semiconductive body and which will essentially prevent any contamination of the semiconductive body by the surrounding atmosphere.

In the accompanying FIGURE 1 there is shown, schematically, suitable apparatus for carrying out the process of the invention. A main line 1 having branch lines 2 and 3 with metering devices such as rotameters $M_2$ and $M_1$, respectively, is provided for admission of an inert gas such as argon to the system. Branch line 4, by appropriate manipulation of valves 9, 10, 11, and 12, is provided for passing the argon through line 3, into a dope saturator or cylinder 20 containing, e.g., solid doping substance with sufficient vapor pressure to be carried by the argon into line 7, through valve 13 and into reservoir R. If the doping substance is normally gaseous it is metered directly from the dope cylinder 20 through line 4, valve 11, line 7 and valve 13 to the reservoir, with valve 10 remaining always closed. In either case the concentration of doping substance in reservoir R is then adjusted to the desired level. This is readily accomplished by closing valves 9, 10, 11, 12, 15 and 14, opening valve 16 leading to a vacuum pump (not shown) and lowering the pressure to, e.g., one-tenth of an atmosphere as measured by a suitable pressure device, such as manometer A. By closing valve 16 and opening valves 9 and 12, the reservoir is brought back to one atmosphere pressure by the admission of argon. At this point the concentration of doping substance is one-tenth of its original concentration. A second similar pump-down and back-fill with argon will reduce the concentration to one one-hundredth of the original concentration. The procedure is repeated until the desired concentration of doping substance in reservoir R is achieved. The system illustrated is also designed to permit dilution of the dope-containing argon in reservoir R with argon from the main stream through valve 15 or through valves 9 and 12, if desired.

Having established the desired concentration of doping substance in reservoir R, the system is now ready for operation. A semiconductor body, such as a silicon rod which has been previously refined, is mounted in zone refiner 18, preferably a floating zone refiner such as described in the Mataré and Emeis patents noted above. Argon is flowed through line 2 into the zone refiner in order to flush out the zone refining apparatus and establish an inert atmosphere therein. A molten zone is created in the silicon rod in the conventional manner, and doping substance is admitted to the zone refining chamber just as the zone refining pass is commenced. In the system illustrated exponentially decaying admission of doping substance is accomplished by metering a push-rate flow of argon through line 3, valves 9, 12, and 13 into reservoir R. As is obvious, branch lines 4 and 6 are closed off as this operation begins. The push rate flow of argon into reservoir R forces doped argon into line 8 and through three-way valve 14 into the main argon stream and thence to the zone refiner in an exponentially decreasing manner. The time constant of the exponential decrease, assuming good mixing of the argon pushing into reservoir R, is equal to the volume of the reservoir divided by the push rate. The quantity of doping substance which reacts with the molten zone of silicon and thus distributes atoms of impurity element in the silicon as it recrystallizes is directly proportional to the concentration of doping substance in the argon ambient.

Since the concentration of doping substance in the reservoir can be adjusted to virtually any level, and the push rate or the volume of the reservoir can be varied over very wide ranges, it is possible to attain any desired concentration of impurity element in the doped-zone-refined rod and virtually any desired time constant for the exponentially decreasing admission of doping substance. It is also possible, if desired, to use a high push rate or to have a large volume in reservoir R and admit the doped argon directly into the zone refiner without the necessity of further diluting with argon from the main stream. However, because of the design and space problems which might arise from such a system, it is preferred to keep both the main argon line and the doped argon line open during operation.

The invention will be further illustrated by the following non-limiting specific examples. Calculation of the amounts of impurity element contained in any particular segment of the doped semiconductive bodies was made by using the standard formula $$\text{Impurity concentration (parts per billion)} = \frac{K}{\text{Resistivity}}$$

where K for acceptor type (P-type) impurities, such as boron, is 290; and for donor type (N-type) impurities, such as phosphorus, is 65. This standard formula is based on equations derived from the best mobility data presently available.

EXAMPLE 1

*Exponential Doping With Boron*

[Distribution coefficient=0.9]

A silicon rod was vacuum zone refined until all electrically active impurities except base boron had been removed. The resistivity profile of the rod was substantially flat, all measurements along the length of the rod showing resistivities varying between about 800 and 900 ohm-centimeters, P-type. This rod was thoroughly etched and cleaned and then mounted in a floating-zone refiner with the initial end in contact with a high quality seed crystal having a resistivity greater than 500 ohm-centimeters. A 1000 millimeter flask was thoroughly flushed with argon after which the internal pressure was lowered to 678 millimeters of mercury (absolute) by a mechanical vacuum pump. Boron trifluoride gas was then bled from a small cylinder into the reservoir until the reservoir pressure reached 760 millimeters of mercury (absolute). The boron trifluoride partial pressure was then reduced to $8.2\times10^{-4}$ millimeters of mercury by a stepwise procedure in which the pressure in the reservoir was reduced to 76 millimeters of mercury and then brought back to 760 millimeters of mercury by back filling with argon in four separate steps, each step thus reducing the amount of boron trifluoride to one-tenth of the amount present in the reservoir at the beginning of each pump-down.

A flow of argon at a rate of 4.05 liters per minute was then begun through the zone refiner, and a molten zone created at the seed end of the silicon rod in conventional manner. As the zone refining pass was commenced (i.e., at time equal to zero) a stream of argon was metered into the doped argon reservoir at a rate of 11 cubic centimeters per minute to push the doped argon into the main argon stream. The zone refining pass was made at a zone travel rate of 20 centimeters per hour. At the completion of the pass the flow of doped argon was discontinued and the silicon rod cooled to room temperature while mantaining the main stream argon flow. Resistivity measurements on the doped crystal gave the following results.

| Distance (in centimeters) from seed end: | P-type resistivity (in ohm-centimeters) |
|---|---|
| 1 | 7.6 |
| 2 | 8.4 |
| 3 | 8.1 |
| 4 | 8.4 |
| 5 | 8.7 |
| 6 | 8.5 |
| 8 | 9.1 |
| 10 | 9.6 |
| 12 | 10.4 |
| 14 | 12.3 |

The slowly ascending resistivity profile indicates that smaller amounts of boron were added as the molten zone traversed through the crystal. Since boron has a distribution coefficient of about 0.9, virtually no segregation occurs during a single zone refining pass and thus if boron was introduced in exponentially decreasing amounts it should appear in the doped rod in the same way. The amounts of boron added along the rod were calculated using the standard formula mentioned above, subtracting the original boron content from the final boron content. A plot of the logarithm of parts per billion boron added versus the distance from the seed end of the crystal or versus the time of zone travel gave essentially a straight line, as shown in FIGURE 2. The time constant of dope addition to the rod calculated from the slope of this line was 98 minutes. This agrees very well with the time constant of the exponentially decreasing addition of doping substance from the reservoir which is equal to the volume of the reservoir divided by the push rate into the reservoir or about 91 minutes.

This example thus demonstrates that a doping substance can be added in exponentially decreasing amounts and that the time constant such addition (i.e., the time in which the amount added will be $1/e$ of the original amount) is equivalent to the volume of a reservoir containing the doping substance divided by the push rate into the reservoir.

EXAMPLE 2

*Doping With Phosphorous*

[Distribution coefficient=0.35]

Gas doping of a semiconductive body with an impurity whose distribution coefficient is less than about 0.7 (e.g., phosphorus) in accordance with the invention, involves addition of dope in exponentially decreasing amounts so as to compensate for segregation of the impurity due to the zone refining.

The procedure in this example was the same as that described in Example 1. The rod to be doped was essentially pure silicon containing only very small amounts of base boron. The reservoir of doping substance was established by flowing argon at 20 cubic centimeters per minute through a phosphorus pentachloride saturator at 20° centigrade, mixing the doped argon with a larger argon stream flowing at 4.05 liters per minute, passing the mixture through a 1-liter reservoir flask for about one hour to assure the establishment of equilibrium conditions, and then trapping the mixture in the one liter reservoir. Just as the floating zone pass along the silicon rod began, a stream of argon flowing at 20 cubic centimeters per minute was fed into the reservoir containing the trapped doped argon to push the doped argon into the main argon stream flowing at 4.05 liters per minute into the zone refiner. The floating zone pass was made at a zone travel rate of 9 inches per hour. Resistivity of the silicon rod before and after doping was as follows:

| Distance from Seed End (Centimeters) | Resistivity (ohm-centimeters) | |
|---|---|---|
| | Before Doping (P-type) | After Doping (N-type) |
| 1 | 1,775 | 17.7 |
| 2 | 1,489 | 23.9 |
| 3 | 1,322 | 19.7 |
| 4 | 1,175 | 19.1 |
| 5 | 1,028 | 19.5 |
| 6 | 1,007 | 18.5 |
| 7 | 896 | 18.1 |
| 8 | 798 | 17.9 |
| 9 | 756 | 18.3 |
| 10 | 638 | 20.0 |
| 11 | 488 | 18.8 |

The doped rod has a very level resistivity profile, thus demonstrating that impurities having distribution coefficients less than about 0.7 can be added in substantially uniform amounts along the length of the rod by adding doping substance in exponentially decreasing amounts to compensate for segregation occurring because of zone-refining.

EXAMPLE 3

*Doping N-Type Rod With Phosphorus*

In this example the rod to be doped had an initial excess of phosphorus impurity and thus had N-type resistivity. More phosphorus was added to the rod in order to lower the resistivity and obtain a uniform concentration of phosphorus along the length of the rod.

A stream of argon flowing at 100 cubic centimeters per minute was passed through a saturator containing white phosphorus at 20° centigrade and mixed with another argon stream flowing at 2.5 liters per minute. The mixture was passed through a 5-liter flask for one hour to assure establishment of equilibrium and then a portion was trapped in the reservoir. An N-type silicon rod was mounted in a zone refiner coupled with the field from a heating coil and fused to a high quality seed crystal, while a stream of argon was flowed through the zone refiner at 4.05 liters per minute A molten zone was created at the seed end of the rod and just as the zone pass was commenced, a stream of argon flowing at 11 cubic centimeters per minute was fed into the reservoir containing the doped argon to push doped argon into the main argon stream going to the zone refiner. The floating zone refinement was performed at a zone travel rate of 6 inches per hour. Resistivity along the rod before and after doping was as follows:

RESISTIVITY BEFORE DOPING (OHM-CENTIMETERS)

| Percent distance from seed: | Resistivity, N-type |
|---|---|
| 5 | 65 |
| 10 | 52.2 |
| 30 | 40.3 |
| 40 | 78.0 |
| 50 | 93.0 |
| 60 | 88.0 |
| 70 | 137 |
| 75 | 146 |
| 85 | 186 |

RESISTIVITY AFTER DOPING (OHM-CENTIMETERS)

| Distance from seed (centimeters): | Resistivity, N-type |
|---|---|
| 1 | 14 |
| 2 | 12.52 |
| 3 | 12.5 |
| 4 | 13.4 |
| 5 | 12.7 |
| 6 | 11.6 |
| 7 | 10.3 |
| 8 | 10.3 |
| 9 | 10.3 |
| 10 | 10.8 |
| 11 | 11.0 |
| 12 | 11.5 |
| 13 | 11.5 |

Again it is seen that although phosphorus has a distribution coefficient less than 0.7, it is possible to add phosphorus to the rod during zone refining in exponentially decreasing amounts to compensate for segregation and thus obtain a uniform concentration of phosphorus along the length of the rod.

As has been shown, the process of this invention provides for the addition of a resistivity-type-determining impurity to a semiconductive body in exponentially decreasing amounts. The process is applicable to gas doping during zone refining of virtually any type of body regardless of whether it is originally P-type or N-type or whether the doping substance is to create P-type or N-type resistivity. The process is especially applicable to doping with impurities having distribution coefficients of less than about 0.7 and greater than about 0.05 since by properly adjusting the time constant of the exponentially decreasing addition of impurity it is possible to compensate for segregation caused by the zone refining and thus obtain substantially constant impurity content along the length of the rod. The process thus eliminates the complicated time consuming procedures presently required to get this uniform impurity concentration in the kown methods for gas doping during zone refining. As stated previously the doped semiconductive bodies produced by the process of this invention have abvious utility in the manufacture of numerous varied electrical devices.

What is claimed is:

1. Process for doping semiconductive bodies selected from the group consisting of silicon and germanium which comprises zone refining said semiconductive body, introducing a gaseous doping substance into the zone refining apparatus just as the zone refining pass is begun, continuing to introduce said doping substance in exponentially decreasing amounts as the zone refining proceeds, discontinuing introduction of the doping substance at the end of the zone refining pass, cooling and recovering the doped zone refined body thus produced.

2. Process as defined in claim 1 wherein said gaseous doping substance is introduced into said zone refining apparatus in a main stream of an inert carrier gas by flowing the inert carrier gas through a reservoir containing said doping substance, prior to introducing said doping substance into the zone refining apparatus.

3. Process as defined in claim 2 wherein said inert gas is argon.

4. Process as defined in claim 3 wherein said gaseous doping substance is selected from the group consisting of arsenic, phosphorus, and halides of boron, arsenic, gallium, phosphorus and antimony.

5. Process which comprises establishing a reservoir of an inert gas containing a small controlled amount of a gaseous doping substance, zone refining a rod of semiconductive material selected from the group consisting of silicon and germanium while flowing a main stream of inert gas thereover, forcing doped inert gas from said reservoir into said main stream of inert gas in exponentially decreasing amounts as the zone refining proceeds, ceasing the flow of doped inert gas at the end of the zone refining pass, and cooling said rod of semiconductive material to ambient temperatures while maintaining the flow of said main stream of inert gas.

6. Process as defined in claim 5 wherein said main stream gas and said doped inert gas is argon.

7. Process as defined in claim 6 wherein said doped inert gas is forced into said main stream of inert gas by flowing argon into said reservoir.

8. Process as defined in claim 7 wherein said doping substance is selected from the group consisting of arsenic, phosphorus, and halides of boron, arsenic, gallium, phosphorus and antimony.

9. In the process of gas doping a semiconductive body while zone refining said body the improvement which comprises adding the gaseous doping substance in exponentially decreasing amounts during a single zone refining pass.

References Cited in the file of this patent

UNITED STATES PATENTS 2,768,914 Buehler et al. ............ Oct. 30, 1956

2,887,453 Billig et al. ............ May 19, 1959